United States Patent [19]

Khan

[11] Patent Number: 5,471,381
[45] Date of Patent: Nov. 28, 1995

[54] INTELLIGENT SERVOMECHANISM CONTROLLER

[75] Inventor: Emdadur R. Khan, San Jose, Calif.

[73] Assignee: National Semiconductor Corporation, Santa Clara, Calif.

[21] Appl. No.: 967,992

[22] Filed: Oct. 28, 1992

Related U.S. Application Data

[63] Continuation-in-part of Ser. No. 585,494, Sep. 20, 1990, abandoned.

[51] Int. Cl.$^6$ .......................... G06F 15/18; G05B 13/02
[52] U.S. Cl. ........................ 364/148; 364/151; 395/906
[58] Field of Search .................. 364/148–152, 364/161–165; 395/21–24, 903–906

[56] References Cited

U.S. PATENT DOCUMENTS

| | | | |
|---|---|---|---|
| 5,159,660 | 10/1992 | Lu et al. | 364/165 |
| 5,175,678 | 12/1992 | Frerichs et al. | 364/165 |
| 5,268,834 | 12/1993 | Sanner et al. | 395/22 |
| 5,285,377 | 2/1994 | Sugasaka et al. | 364/148 |
| 5,305,230 | 4/1994 | Matsumoto et al. | 364/149 |
| 5,311,421 | 5/1994 | Nomura et al. | 395/906 |

*Primary Examiner*—Roy N. Envall, Jr.
*Assistant Examiner*—Thomas E. Brown
*Attorney, Agent, or Firm*—Limbach & Limbach

[57] ABSTRACT

A controller for a servomechanism (such as a computer disk drive) includes both a conventional dumb controller and a neural network controller working in conjunction with one another. In one embodiment, the neural network controller and dumb controller operate in a quasi-series configuration, with the neural network controller receiving and processing the output of the dumb controller to produce a servomechanism control signal. In another embodiment, the neural network controller and dumb controller operate in a quasi-parallel configuration, with the outputs of the neural network controller and dumb controller being combined to produce an intelligent servomechanism control signal. In yet another embodiment, the neural network controller and dumb controller operate in a quasi-series configuration during the recall phase, following the learning phase in which the neural network controller is trained to develop an indirect performance model of the serial combination of the dumb controller and servomechanism. In still another embodiment, the neural network controller and dumb controller operate in a quasi-series configuration during the recall phase, while a model neural network is used to develop a direct performance model during the learning phase of the serial combination of the dumb controller and servomechanism which is then used to train the neural network controller for its operation during the recall phase.

52 Claims, 8 Drawing Sheets

INTELLIGENT SERVOMECHANISM CONTROLLER

RELATED APPLICATIONS

This is a Continuation-In-Part of Application Ser. No. 07/585,494, filed Sep. 20, 1990, now abandoned.

BACKGROUND OF THE INVENTION

1. Field of the Invention

The present invention relates to controllers for servomechanisms, and in particular, to a digital servomechanism controller that includes both a "dumb" servomechanism controller and a neural network based servomechanism controller working in conjunction with one another.

2. Description of the Related Art

Computer disk drive servomechanisms are electromechanical devices which require control systems for controlling their rotational velocity and the positioning of their read, write and position sensing heads. Such control systems, commonly referred to as servo controllers, are well known in the art. As illustrated in FIG. 1, a servo controller and the servomechanism to be controlled are typically interconnected in a classical feedback control system design.

The servo controller provides a servo control signal to the "plant," i.e. the disk drive servomechanism, for controlling the performance thereof, e.g. to rotate the storage media and position the read, write and position sensing heads. The plant generates feedback signals which represent actual performance parameters of the plant, e.g. the actual velocity of the storage media and the actual position of the heads. Each actual performance signal is combined with a reference signal which represents the desired performance of the plant. This produces an "error" signal (representing the difference between the desired and actual performance signals) which is used to drive the servo controller.

The servo controller adjusts its servo control signal output in accordance with its error signal input. As the performance of the plant changes in accordance with its servo control signal input, the actual performance feedback signal more closely resembles the reference signal, thereby causing the error signal to decrease. Once the error signal has decreased below a predetermined threshold value, the servo controller ceases to modify its servo control signal output, and instead simply maintains its servo control signal output until such time as the error signal once again rises above the predetermined threshold.

The simplest servo controller is a "dumb" (e.g. non-programmable, or with a fixed or static program) analog network which accepts an analog error signal and provides an analog servo control signal to the plant in accordance with a substantially fixed design or algorithm. In turn, the actual performance feedback signal and reference signal are analog signals as well. Typical control characteristics provided by analog servo controllers are referred to as "proportional," "integral," "derivative" and "proportional-integral-derivative" ("PID").

A "proportional" type of servo controller produces a servo control signal which is proportional to the error signal and can be described as follows:

$U=K_p E$ where:

U=servo control signal

E=error signal $K_p$=proportional feedback coefficient

An "integral" type of servo controller produces a servo control signal based upon the integral of the error signal and can be described as follows:

$$U = \frac{K_P}{T_I} \int E dt$$

where:

$T_I$=integral feedback coefficient dt=time differential

A "derivative" type of servo controller produces a servo control signal which is based upon the derivative of the error signal and can be described as follows:

$$U = K_P T_D \frac{dE}{dt}$$

where: $T_D$ = derivative feedback coefficient $\frac{dE}{dt}$ = derivative of error signal with respect to time A "PID" type of servo controller produces a servo control signal which can be proportional to the error signal, while simultaneously containing components based upon the integral or derivative of the error signal, or both. Such a servo control signal can be described as follows:

$$U = K_P \left[ 1 + \frac{1}{T_I} \int E dt + T_D \frac{dE}{dt} \right]$$

The relative simplicity of analog servo controllers, however, renders them inadequate for controlling today's high performance disk drive systems having increasingly denser storage capabilities. This has resulted in the widespread use of digital servo controllers.

Digital servo controllers, particularly those using microprocessors, allow for more sophisticated control characteristics. By properly programming its microprocessor, a digital servo controller can also be a "proportional," "integral," "derivative" or "PID" type of servo controller. But, the flexibility afforded by the programmability of the digital servo controller allows more precise control to be exercised.

However, digital servo controllers have limitations of their own. Even with their programmability, their design, whether with respect to hardware or software, is essentially fixed. In other words, the control characteristics are fixed in the sense that they cannot anticipate and compensate for the varying control environment and system nonlinearities which inevitably exist but cannot be precisely predicted or modeled.

As will be appreciated, variances in the control environment can arise and system nonlinearities can be introduced in a number of ways. For example, variances in the control environment can arise due to changes in the operating characteristics or tolerances of the hardware components used to construct the system. Such changes can be induced by factors such as changes in temperature, humidity, shock, vibration, power supply voltages, etc. System nonlinearities can be introduced by system hardware components which vary randomly from their nominal rated values, and yet are still within their rated tolerances.

To overcome the limitations of a simple digital servo controller, "adaptive controllers" have been developed. As illustrated in FIG. 2, an adaptive controller is used in conjunction with a digital servo controller. Two error signals are produced, error signals "A" and "B," for use by the digital servo controller and adaptive controller, respectively.

The actual performance signal produced by the plant, in addition to being compared with the reference signal directly, is also compared to the output signal of the "reference model." The reference model is a preprogrammed digital circuit, or software model, which receives the reference signal and produces an output signal based upon a desired copy of the servomechanism system. In other words, the reference model is a mathematical model based upon historical data regarding the control environment and system nonlinearities of the system, including the plant and servo controller. This model is then used to generate a desired model output signal.

The result of this comparison between the actual performance signal and the modified reference signal, i.e. error signal B, is used to drive the adaptive controller. In accordance therewith, the adaptive controller provides a signal to the servo controller which is used to adjust the parameters of the control characteristics used by the digital servo controller in producing the servo control signal for the plant.

For example, the signal from the adaptive controller can be used to adjust the "proportional," "integral" or "derivative" constants or coefficients used by the servo controller in generating the servo control signal. By using the adaptive controller in this manner, the otherwise fixed design or algorithm of the servo controller can be adapted in accordance with the reference model to more closely compensate for the varying control environment and system nonlinearities. In other words, using the adaptive controller in this way allows the overall system operation to track the operation model stored as the reference model.

However, adaptive controllers tend to be quite complex and typically require large amounts of computation time. Furthermore, mathematical models (e.g. for the reference model) which give good representations of the servomechanism control environment and the disk drive system are very difficult, if not impossible, to achieve.

The overall operating environment sought to be controlled is inherently nonlinear. Therefore, the requisite mathematical models should ideally also be nonlinear so as to more closely approximate that environment. However, such nonlinear models provide ad hoc control solutions and are unique for each application to avoid introducing excessive errors of their own. Further, they are generally quite complex and difficult to redesign for use in other applications.

Linearized models, i.e. models which are based upon linear mathematical models, have been used with some success. However, while linear models are simpler and may be more easily redesigned for use in other applications, their performance outside of the relatively narrow regions for which they are optimized has been disappointing.

To meet this need for servo controllers which can adaptively control inherently nonlinear servomechanisms in a varying control environment, intelligent servo controllers have been proposed. An advantage of intelligent servo controllers is their ability to provide more reliable generalized solutions for controlling servomechanisms over wider ranges of operating conditions and uncertainties. This is in contrast to the ad hoc control solutions provided by adaptive controllers using nonlinear models which tend to be application specific.

One type of proposed intelligent servo controller uses artificial intelligence. Another proposed type, which offers better performance, is referred to as "fuzzy." However, the artificial intelligence or "fuzzy" controllers are still computation intensive and based upon rules or algorithms. Therefore, their generalization capabilities are poor. Thus, they have not been widely accepted.

A third type of proposed intelligent servo controller, which has offered the best performance so far, is that which uses a neural network. Its advantage is that a neural network is not reliant upon algorithms and is capable of adapting to virtually all parameter or system variations. Therefore, it has better generalization capabilities.

Using a neural network servo controller to control a disk drive servomechanism requires that the neural network servo controller be coupled to the plant in two distinct configurations, as shown in FIGS. 3A–3B. As shown in FIG. 3A, the initial configuration establishes the general learning phase for the neural network servo controller. The neural network servo controller receives the actual performance signal from the plant and adjusts its adaptive weights in accordance with the error signal produced by the comparison of the reference signal with the output signal of the neural network servo controller. In this configuration, the neural network servo controller learns the inverse model of the plant broadly.

The second configuration, shown in FIG. 3B, is the specialized learning phase for the neural network servo controller. The reference signal drives the neural network servo controller directly, and is also compared to the actual performance signal output of the plant to produce the error signal. The error signal is then used to further train the neural network. Therefore, in this configuration, the neural network servo controller controls the plant via the servo control signal, while simultaneously learning and adapting to variations in the control environment and system nonlinearities.

However, the use of a neural network based servo controller has limitations with respect to its practicality. The general learning phase, as illustrated in FIG. 3A, is very broad. A large number of hardware neurons, or software based calculations, are needed to take advantage of the higher resolution and accuracy capabilities provided by the neural network. Furthermore, to achieve maximal generalized learning, rigorous learning in the form of using many sets of input patterns, i.e. reference signals, is required.

Therefore, it would be desirable to have a disk drive servo controller which provides the resolution, accuracy and adaptability of a neural network, but which does not require an impractically large number of hardware neurons or software based calculations, nor require extensive input learning patterns.

SUMMARY OF THE INVENTION

The present invention provides an intelligent controller for use in conjunction with a dumb controller for jointly controlling a plant, such as a servomechanism for a computer disk drive. The intelligent controller uses a neural network which, in accordance with learned system nonlinearities and learned variances in the control environment, generates an intelligent control signal and works with the dumb controller to produce an adaptive control signal for controlling a plant. A preferred embodiment of a controller in accordance with the present invention includes a neural network controller which receives the dumb control signal generated by the dumb controller and an error signal which is related to that received and used by the dumb controller. Using this error signal, the neural network controller learns and adapts to system nonlinearities and variances in the control environment, as reflected in the error signal, by modifying its adaptive weights in accordance with the error signal. The neural network controller further receives a dumb control signal generated by the dumb controller and uses its adaptive weights in processing the dumb control signal to generate an adaptive control signal. This adaptive control signal is then used to control a plant. The received error signal can be used to adaptively weight, e.g. electronically scale, the dumb control signal to produce the adaptive control signal. Alternatively, the received error signal can be used to generate new adaptive weight values, which are stored in a memory circuit. These adaptive weight values can then be retrieved from the memory circuit as a signal which is summed together with the received dumb control signal to generate the adaptive control signal.

Another preferred embodiment of a controller in accordance with the present invention includes a neural network controller and a signal combiner. The neural network controller receives a reference signal and a controller weights adjust signal, and provides in accordance therewith an intelligent control signal. The reference signal represents a desired plant performance parameter and the controller weights adjust signal provides for adjustment of the inter-neuron, or adaptive, weights of the neural network controller. The signal combiner combines the intelligent control signal with a dumb control signal from a dumb controller, and provides in accordance therewith a plant control signal.

An alternative preferred embodiment of a controller in accordance with the present invention also includes a neural network controller and a signal combiner. When configured to operate in its recall phase, the neural network controller receives a reference signal representing a desired plant performance parameter and provides in accordance therewith an intelligent control signal. A signal combiner combines the intelligent control signal and an actual performance signal, and provides in accordance therewith a performance error signal. The actual performance signal represents an actual plant performance parameter, and the performance error signal represents a difference between the desired plant performance parameter and the actual plant performance parameter. The performance error signal can be used by a dumb controller for generating a plant control signal. When configured to operate in its learning phase, the neural network controller receives an actual performance signal and a performance model error signal, and provides in accordance therewith a system inverse performance model signal. The actual performance signal represents an actual plant performance parameter of a plant within a system which includes the plant and a dumb controller therefor. The performance model error signal represents a difference between the system inverse performance model signal and a reference signal. The system inverse performance model signal represents a system inverse performance model of the system (e.g. combined dumb controller and plant). The reference signal represents a desired plant performance parameter of the plant. A signal combiner combines the system inverse performance model signal and reference signal, and provides in accordance therewith the performance model error signal.

A further alternative preferred embodiment of a controller in accordance with the present invention includes a control neural network, a model neural network, a control signal combiner and a model signal combiner. The control neural network receives a reference signal and a controller weights adjust signal, and provides in accordance therewith an intelligent control signal. The reference signal represents a desired plant performance parameter. The controller weights adjust signal provides for adjustment of the inter-neuron, or adaptive, weights of the control neural network. The model neural network receives the intelligent control signal and a performance model error signal, and provides in accordance therewith a system performance model signal. The performance model error signal represents a difference between the system performance model signal and an actual performance signal. The system performance model signal represents a performance model of a system which includes a dumb controller and a plant. The actual performance signal represents an actual plant performance parameter of the plant. The control signal combiner receives and combines the reference signal and the system performance model signal, and provides in accordance therewith an error feedback signal which can be back-propagated through the model neural network to provide the controller weights adjust signal. The model signal combiner receives and combines the system performance model signal and the actual performance signal, and provides in accordance therewith the performance model error signal.

These and other objectives, features and advantages of the present invention will be readily understood upon consideration of the following detailed description of the invention and the accompanying drawings.

DETAILED DESCRIPTION OF THE INVENTION

Figure 1:
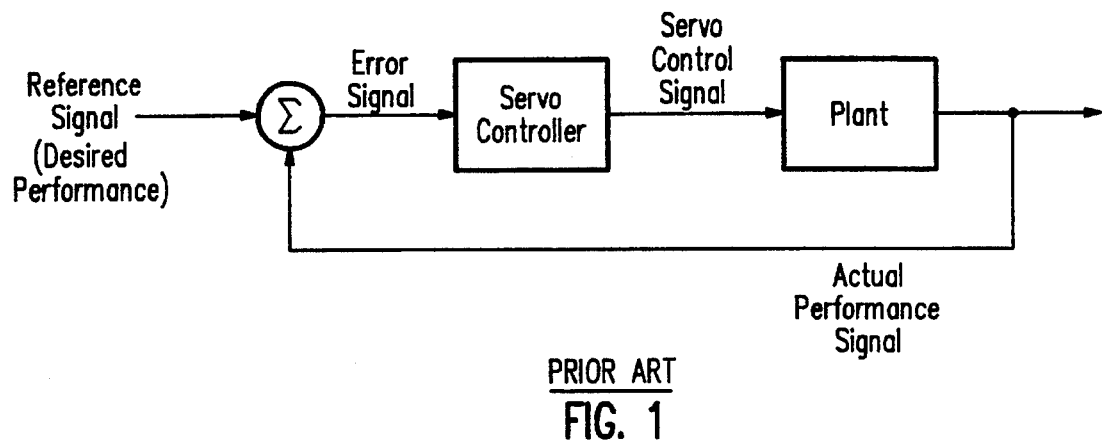
FIG. 1 illustrates a functional block diagram of a conventional feedback control system for controlling a servomechanism.
Figure 2:
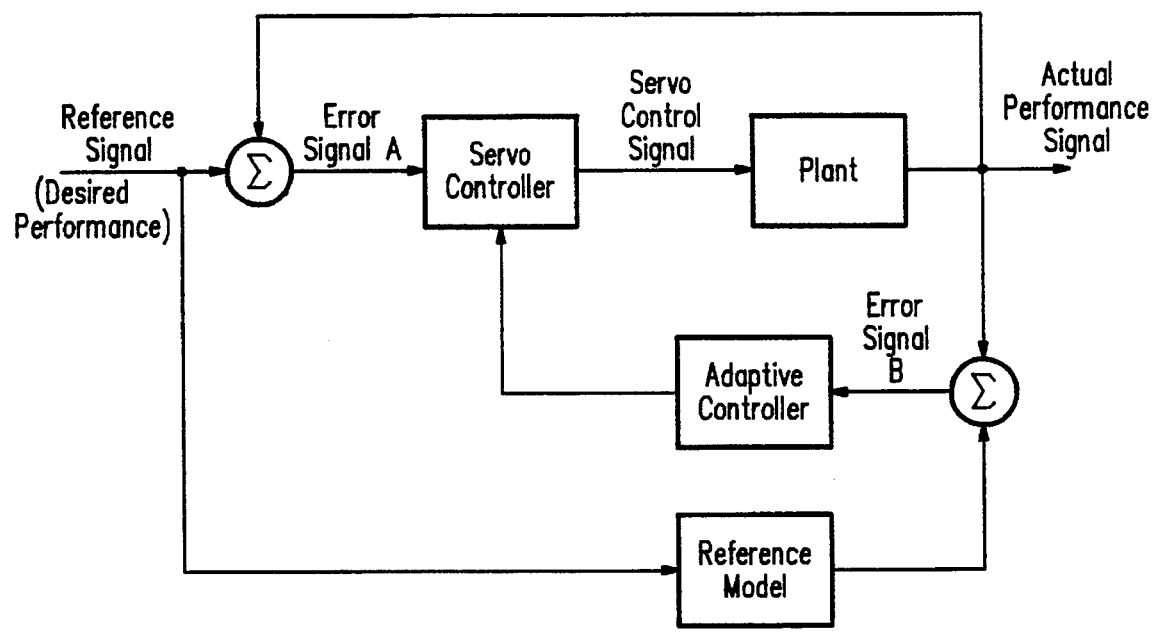
FIG. 2 illustrates a functional block diagram of a conventional feedback control system using a model reference adaptive controller for controlling a servomechanism.
Figure 3A:
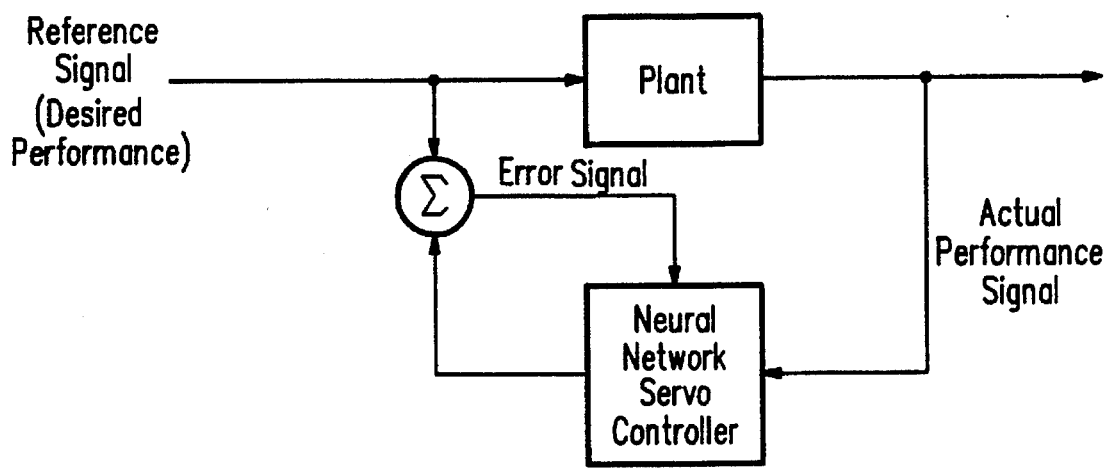
FIGS. 3A and 3B illustrate functional block diagrams of generalized and specialized learning phase configurations, respectively, for a neural network servo controller used to control a servomechanism.
Figure 3B:
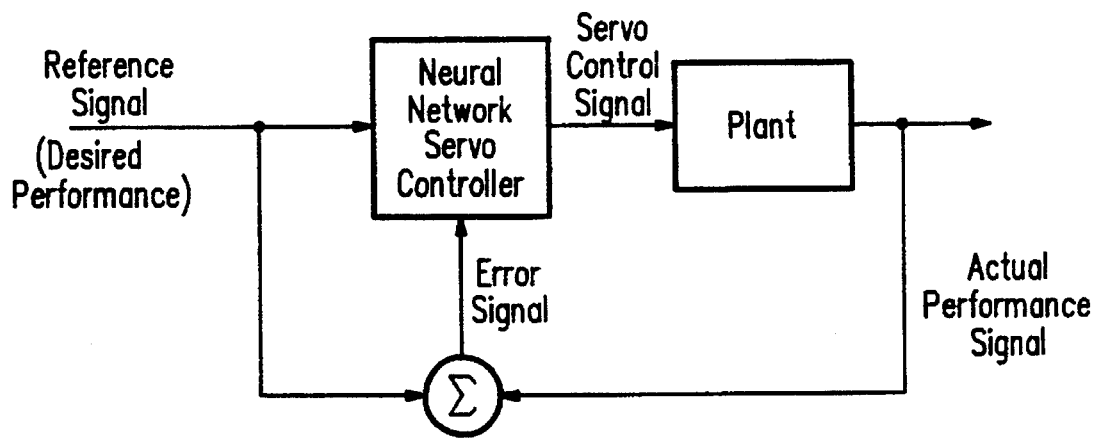
Figure 4A:
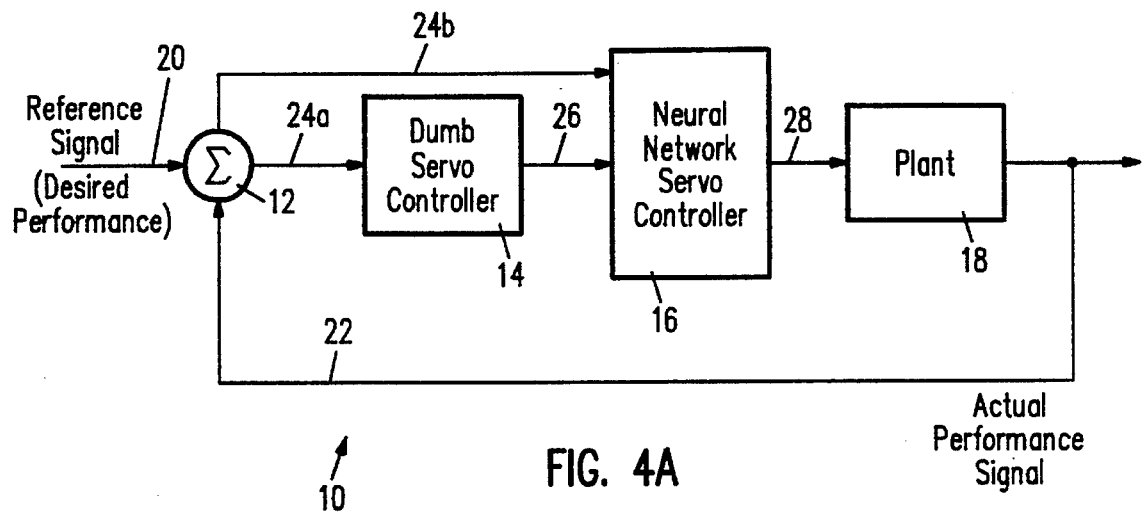
FIG. 4A illustrates a functional block diagram of a servomechanism system using a preferred embodiment of an intelligent controller in accordance with the present invention.

FIG. 4A shows a servomechanism system 10 that includes a signal combiner 12, a dumb servo controller 14, a neural network servo controller 16, and a plant (e.g. computer disk drive servomechanism) 18, interconnected as shown. As described in greater detail below, in accordance with the present invention, the neural network servo controller 16 is used in conjunction with the dumb servo controller 14 to control the plant 18.

It will be understood that the present invention is not limited to controlling only computer disk drive servomechanisms, but can be used for controlling virtually any servomechanism. The following discussion refers specifically to computer disk drive servomechanisms for the purpose of providing an exemplary servomechanism environment in which the benefits and advantages of the present invention can be realized.

The input signal combiner 12 receives a reference signal 20 and an actual performance signal 22. The reference signal 20 represents the desired performance of the plant 18. For example, the reference signal 20 can represent the desired rotational velocity of the storage media or, in a perhaps more advantageous application, the desired positioning of the read or write heads within the plant 18. The actual performance signal 22 represents the actual value of the performance parameter sought to be controlled.

The signal combiner 12 combines these signals 20, 22 to selectively produce two error signals 24a, 24b to provide an error input signal 24a to the dumb servo controller 14 and an error input signal 24b to the neural network servo controller 16. As will be appreciated, typically the signal combiner 12 will be a summer, or adder, circuit which adds the input signals 20, 22. It will be further appreciated that, prior to their summation, one of the input signals 20, 22 is typically inverted, thereby causing the resulting error signals 24a, 24b to represent the difference between, or algebraic summation of, the input signals 20, 22.

The dumb servo controller 14 generates a dumb servo control signal 26 in accordance with its error input signal 24a. The dumb servo controller 14 can be any of several types of dumb servo controllers well known in the art, e.g. analog, digital or conventional adaptive controller. The dumb servo control signal 26 is outputted for coupling into the neural network servo controller 16.

The neural network servo controller 16 can include an analog or digital neural network. Further, as explained more fully below, a digital neural network can be substantially implemented in hardware (e.g. using digital circuits such as flip-flops or registers) or in software (e.g. using a programmable microprocessor).

Regardless of which type is used, as is known in the art, a simple neural network substantially implemented in hardware has three basic functional elements, namely, an "input layer," an "output layer" and "adaptive weights." The input layer typically consists of multiple neurons which provide means by which input signals can be received. The output layer typically consists of at least one neuron which provides means by which an output signal can be provided. (As is further known in the art, other more complex neural networks often also have at least one "hidden" layer which receives and processes signals from the input layer and provides those processed signals to the output layer.) The adaptive weights provide means by which the input signals can be processed (e.g. scaled) to provide the output signal.

If the hardware neural network is analog, the input and output layers provide nodes for receiving or providing analog signals (e.g. voltages or currents), respectively, and the adaptive weights provide means by which the processing can be accomplished (e.g. resistors, transistors, etc.). Similarly, if the hardware neural network is digital, the input and output layers provide digital circuits (e.g. flip-flops, registers, etc.) for receiving or providing digital signals, respectively, and the adaptive weights provide means by which the processing can be accomplished (e.g. digital circuits such as flip-flops, registers, etc.).

A neural network substantially implemented in software uses functional equivalents to simulate the three neural network functional elements, i.e. the "input layer," "output layer" and "adaptive weights" (or four neural network functional elements if a "hidden layer" is to be simulated). The input layer equivalent is a microprocessor which receives the input signal data. The adaptive weights consist of numeric values computed by the microprocessor and stored in a memory (e.g. random access memory ("RAM"), etc.). The output layer equivalent can be any means of providing the final output signal. For example, the output layer equivalent can include a signal combiner (e.g. adder or multiplier circuit) wherein the adaptive weights are combined with the input signal or data to form the final output signal.

If the adaptive weights are to be responsive to external stimuli other than the normal input signals, such as other external signals, the neural network can further include means (in addition to the input layer) for receiving other external signals to be used for controlling, or otherwise affecting, the adaptive weights. Similar to the input layer, such means for receiving other external signals can be nodes, digital circuits or microprocessor, as appropriate, for a hardware or software neural network implementation.

The neural network servo controller 16 receives the dumb servo control signal 26 via its input layer and provides an intelligent servo control signal 28 via its output layer. Its error input signal 24b is used to change the adaptive weights within the neural network servo controller 16. Normally, threshold values for the error input signal 24b are predetermined so that the adaptive weights of the neural network servo controller 16 will not be modified where the value of the error input signal 24b falls below, or alternatively, rises above, such threshold values. Thus, in accordance with the adaptive weights, as modified in accordance with the error input signal 24b, the neural network servo controller 16 processes the dumb servo control signal 26 to produce the intelligent servo control signal 28 used to control the plant 18.

As the actual performance of the plant 18 varies (e.g. over time, due to variations in its operating environment or due to system nonlinearities), as reflected in the actual performance signal 22, the error signal 24 will also vary. In turn, the error input signals 24a, 24b for the dumb 14 and neural network 16 servo controllers also vary. As described above, the dumb servo controller 14 is limited in its ability to precisely respond to and compensate for many causes for such variations in the actual performance. Therefore, its dumb servo control signal 26 will not change appropriately to counteract such performance changes.

However, the neural network servo controller 16 adapts to such actual performance changes by altering its adaptive weights in accordance with variations in its error input signal 24b. The neural network servo controller 16 then processes the dumb servo control signal 26 appropriately to produce an intelligent servo control signal 28 which compensates for changes in actual performance by the overall system 10.

As will be readily appreciated by one of ordinary skill in the art, any of the functional elements 12, 14, 16, 18 or signals 20, 22, 24, 26, 28 referred to in the foregoing discussion and shown in FIG. 4A can be in analog or digital form. If any of the signals 20, 22, 24, 26, 28 are in analog form, such analog signals can be in the form of either voltages or currents. Alternatively, if any of the signals 20, 22, 24, 26, 28 are in digital form, such digital signals can be in serial, parallel, single-bit or multiple-bit form. Thus, any processing involving any of the signals 20, 22, 24, 26, 28, e.g. alteration of the adaptive weights in the neural network servo controller 16 in accordance with its error input signal 24b, can be accomplished with appropriately designed circuitry using well known components, such as transistors, resistors or digital circuits.

It will be further appreciated that if any of the signals 20, 22, 24, 26, 28 are in analog form, the corresponding inputs or outputs of the functional elements 12, 14, 16, 18 can be nodes appropriate for inputting or outputting voltages or currents. If any of the signals 20, 22, 24, 26, 28 are in digital form, the corresponding inputs and outputs of the functional elements 12, 14, 16, 18 can be digital circuits appropriate for inputting or outputting serial, parallel, single-bit or multiple-bit digital signals. Moreover, if the signals 20, 22, 24, 26, 28 are combinations of analog or digital signals, the corresponding inputs or outputs of the functional elements 12, 14, 16, 18 can use analog-to-digital or digital-to-analog converters, as appropriate.

Figure 4B:
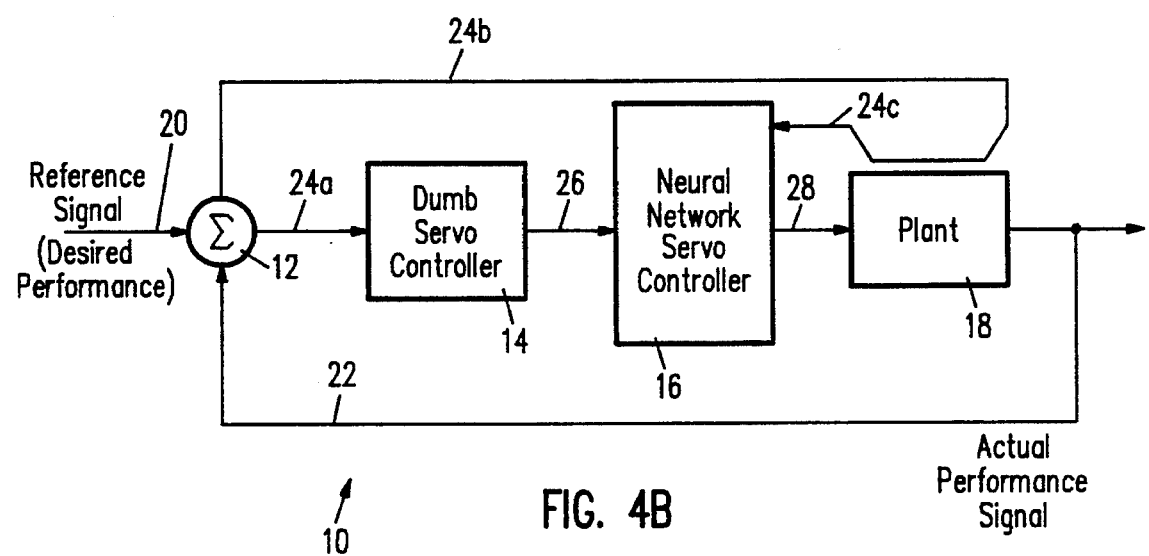
FIGS. 4B and 4C illustrate functional block diagrams of the servomechanism system of FIG. 4A using error back-propagation.

Referring to FIG. 4B, the system of FIG. 4A can also be configured to use error back-propagation to back-propagate the error input signal 24b through the plant 18 (discussed further below) to produce a back-propagated error signal 24c as shown.

Figure 4C:
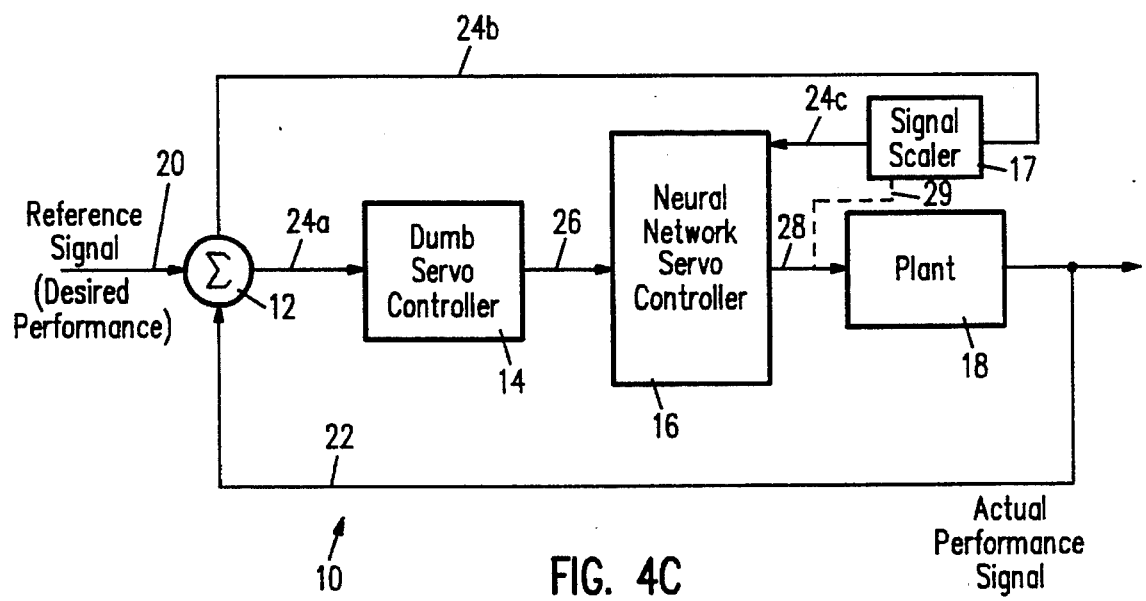

Referring to FIG. 4C, the above-discussed back-propagation of the error input signal 24b can be implemented by using a signal scaler 17 to receive and "scale" the error input signal 24b in accordance with the error back-propagation model to produce the back-propagated error signal 24c as shown. As indicated by the dashed line 29, back-propagation of the error signal 24b is a function of the intelligent servo control signal 28 as follows:

$$\delta = \frac{df_{N(out)}}{df_{N(in)}} \cdot (S_{PD} - S_{PA}) \frac{\partial S_{PA}}{\partial S_{IP}} \quad (1)$$

where:

$\delta$ = back-propagated error $\frac{df_{N(out)}}{df_{N(in)}}$ = derivative of neuron activation function output with respect to its input for neuron layer within neural network controller 16 whose weights are to be adjusted $S_{PD}$ = desired plant output signal -continued $S_{PA}$ = actual plant output signal 22

$\frac{\partial S_{PA}}{\partial S_{IP}}$ = partial derivative of actual plant output signal 22 with respect to actual plant input signal 28

As should be understood from equation (1) above, this "scaling" is accomplished by multiplying the output error $(S_{PD}-S_{PA})$ by the derivative of the output (e.g. of the plant 18) with respect to the input (e.g. of the plant 18). Further, it should be understood that as used herein, such signal "scaling" can include linear or nonlinear scaling of the error input signal 24b (thereby representing a linear or nonlinear plant transfer function). If strictly analog "scaling" of analog signals is involved, the signal scaler 17 can be implemented with some form of analog signal amplifier or attenuator, of which many types are well known in the art. If digital "scaling" is desired, the signal scaler 17 can be implemented with any of many well known digital signal processing elements, such as a digital signal processor ("DSP"), a lookup table or a preprogrammed microprocessor.

One preferred embodiment of the intelligent servomechanism controller in accordance with the present invention, as illustrated in FIGS. 4A–4C and discussed above, envisions a neural network servo controller 16 implemented substantially in hardware. However, as discussed below, it will be appreciated that the neural network servo controller 16 can alternatively be implemented substantially in software.

The above-discussed error back-propagation model is represented by the signal scaler 17 and represents the error back-propagation model of the plant 18. As used herein, the error back-propagation model of an element (e.g. in this case the plant 18) represents the error (e.g. the difference between the actual and desired outputs) of that element (the plant 18) multiplied by the derivative of the actual output of the element (e.g. actual output signal 22) with respect to the input of the element (e.g. input signal 28).

Figure 5A:
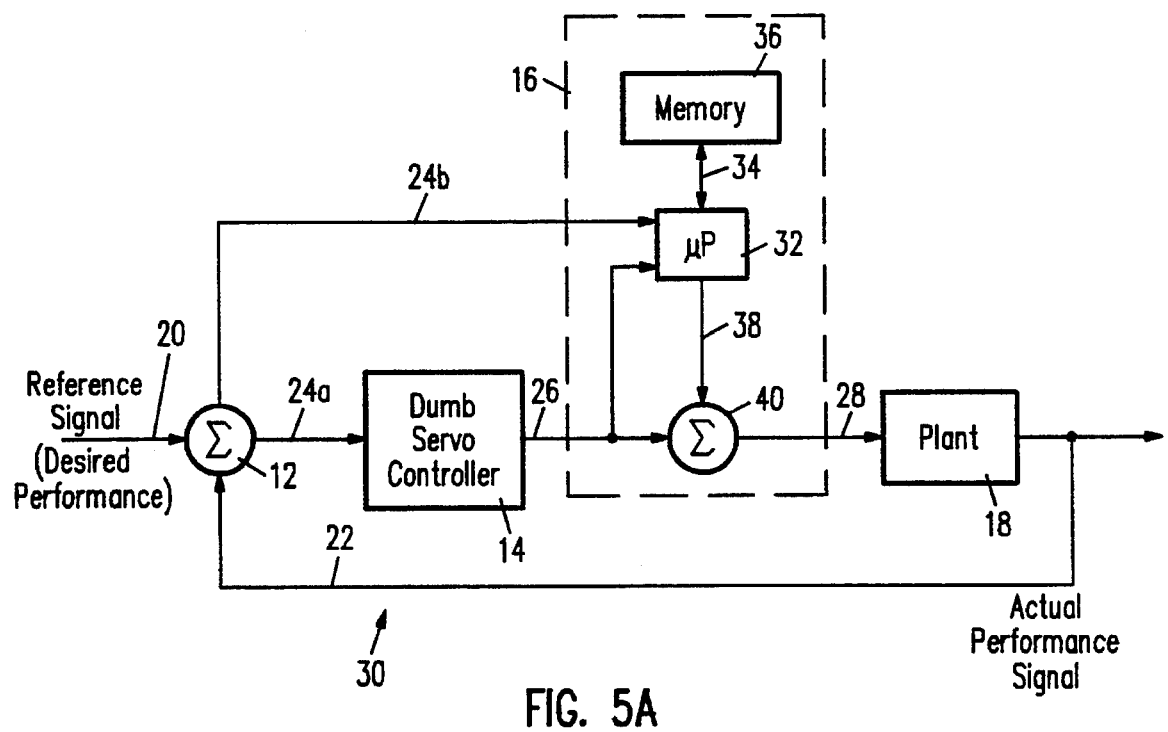
FIG. 5A illustrates a functional block diagram of a servomechanism system using an alternative preferred embodiment of an intelligent controller in accordance with the present invention.

Referring to FIG. 5A, an alternative preferred embodiment of the intelligent servomechanism controller in accordance with the present invention uses a neural network servo controller 16 which is implemented substantially in software. Similar to the system 10 using the hardware implementation for the present invention, the servomechanism system 30 using the alternative preferred embodiment uses a signal combiner 12, dumb servo controller 14, neural network servo controller 16 (including a microprocessor 32, memory 36 and signal combiner 40), and plant 18, interconnected as shown.

The functional operation of the system 30 in FIG. 5A is in accordance with the foregoing description for the system 10 of FIG. 4A, except for the neural network servo controller 16. In this alternative preferred embodiment, the neural network servo controller 16 programmably operates on the dumb servo control signal 26 in accordance with its error input signal 24b with a microprocessor 32, and generates adaptive weights 34 and stores them in a memory circuit 36. If the error input signal 24b falls below, or alternatively rises above, predetermined thresholds, the microprocessor 32 calculates new adaptive weights 34 for processing the dumb servo control signal 26. The stored adaptive weights 34 within the memory 36 are subsequently read out to the microprocessor 32, which generates in accordance therewith a control signal 38. This control signal is sent to a signal combiner 40 where it and the dumb servo control signal 26 are summed together to produce the intelligent servo control signal 28.

The alternative preferred embodiment of the present invention, as illustrated in FIG. 5A, operates differently from the embodiment illustrated in FIG. 4A in that, rather than using a substantially pure hardware implementation to adjust the adaptive weights of the neural network, the microprocessor 32 is programmed to recompute, as needed, the numeric values for the adaptive weights 34. Once the adaptive weights 34 are recomputed, the memory 36 is updated at selective intervals, i.e. the recomputed adaptive weights 34 are stored in the memory 36, replacing the prior corresponding adaptive weights 34 as appropriate.

Figure 5B:
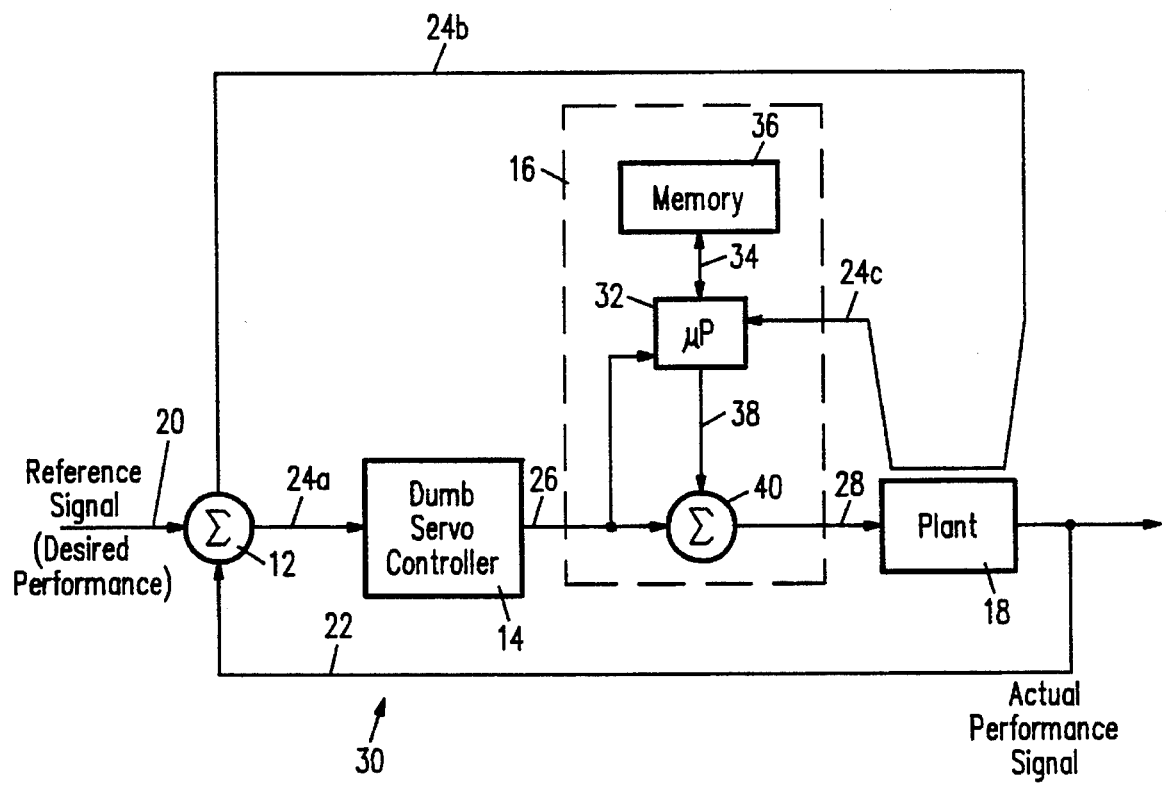
FIGS. 5B and 5C illustrate functional block diagrams of the servomechanism system of FIG. 5A using error back-propagation.

Referring to FIG. 5B, the system of FIG. 5A can also be configured to use error back-propagation (as discussed above) of the error input signal 24b (using a error back-propagation model of the combined signal combiner 40 and plant 18) to produce a back-propagated error signal 24c as shown. (It should be understood that no contribution from the dumb control signal 26 appears since it remains constant (i.e. a scalar, the derivative of which is zero) while the error is back-propagated through the plant 18.)

Figure 5C:
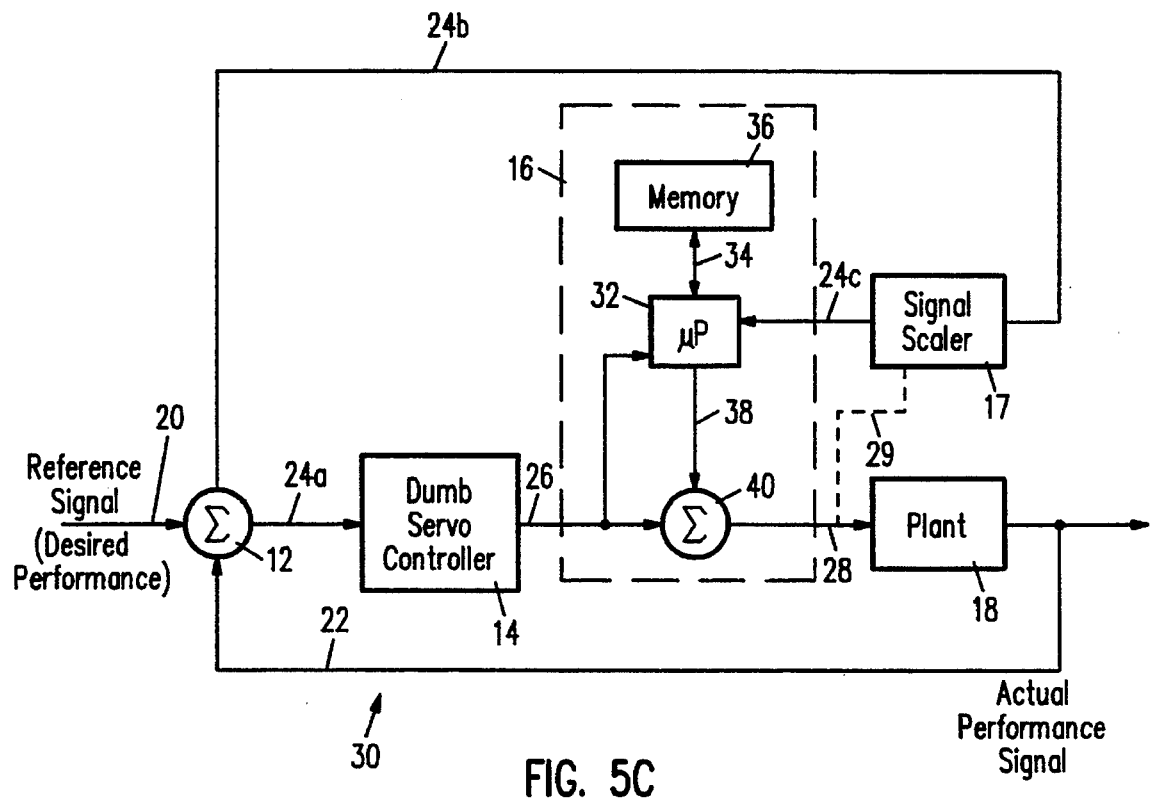

Referring to FIG. 5C, back-propagation of the error input signal 24b can be implemented by using a signal scaler 17 (as discussed above) to receive and "scale" (e.g. linearly or nonlinearly) the error input signal 24b in accordance with Equation (1) above to produce the back-propagated error signal 24c as shown.

The neural network servo controller 16 implemented substantially in hardware provides higher speed, resolution and accuracy when used in conjunction with the dumb servo controller 14, as illustrated in FIG. 4A. The hardware implemented, neural network servo controller 16 is coupled to operate serially with the dumb servo controller 14 since the neural network's adaptive weights can all be changed simultaneously, thereby introducing minimal time delay, and therefore, higher speed.

The dumb servo control signal 26 from the dumb servo controller 14 is processed (e.g. corrected or compensated) by the neural network servo controller 16 for controlling the plant 18. By using both controllers 14, 16 together, fewer neurons are needed within the neural network servo controller 16 since the dumb servo controller 14 provides broad, or general, control. Therefore, the fewer neurons which are used can focus on learning within a narrower range of values for providing narrow, or specialized, control, thereby providing higher resolution and accuracy.

The neural network servo controller 16 implemented substantially in software is also coupled to operate serially with the dumb servo controller 14. The microprocessor 32 computes adaptive weights 34 for the neural network which are then stored in the memory 36 for subsequent retrieval and use by the microprocessor 32 in generating a control signal 38 for combining with the dumb servo control signal 26 from the dumb servo controller 14 for jointly controlling the plant 18.

An important advantage of an intelligent servomechanism controller in accordance with the present invention is that minimal redesign of a known, existing dumb servomechanism controller is needed. The intelligent servomechanism controller of the present invention is used in conjunction with an already existing dumb controller. The intelligent controller 16 adjusts its adaptive weights in accordance with the error signal 24b produced by the comparison of the reference signal 20 with the output signal 22 of the plant 18, and processes the dumb servo control signal 26 appropriately to produce an intelligent servo control signal 28.

Thereafter, due to the dynamic "learning" by the intelligent controller 16, the resolution and accuracy of control of the servomechanism by the dumb servo controller 14 is greatly enhanced, with minimal redesign thereof being required.

Figure 6A:
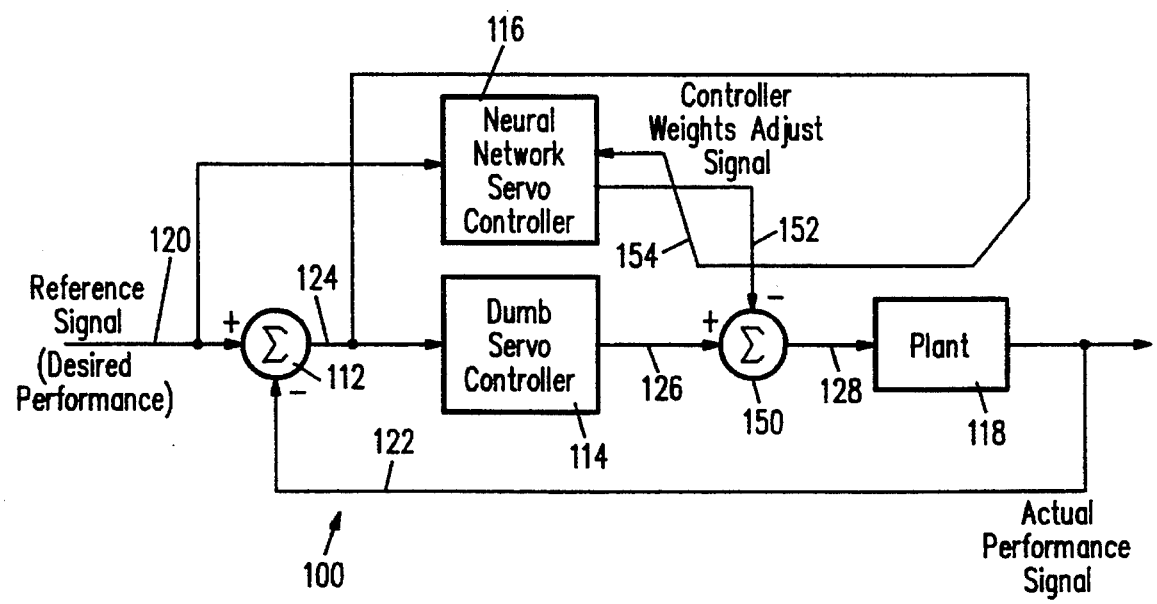
FIGS. 6A and 6B illustrate functional block diagrams of an alternative preferred embodiment of a servomechanism system using an intelligent controller in accordance with the present invention.

Referring to FIG. 6A, a system 100 using a controller in accordance with another preferred embodiment of the present invention includes an input signal combiner 112, dumb controller 114, neural network controller 116, control signal combiner 150 and plant 118 (e.g. servomechanism), connected substantially as shown.

The reference signal 120, representing a desired performance parameter of the plant 118, is received by the input signal combiner 112 and input layer of the neural network controller 116. The input signal combiner 112 also receives an actual performance signal 122 from the plant 118, which represents an actual performance parameter of the plant 118. The input signal combiner 112 algebraically combines the reference 120 and actual performance 122 signals. This signal combination is outputted from the input signal combiner 112 in the form of a performance error signal 124, which goes to the dumb controller 114 and neural network controller 116. For the neural network controller 116, the performance error signal 124 is modified, e.g. back-propagated, to produce a controller weights adjust signal 154 for use in changing its adaptive weights (discussed further below).

The dumb controller 114 provides a dumb control signal 126 and the neural network controller 116 (via its output layer) provides an intelligent control signal 152, both of which are received and combined by the control signal combiner 150. The control signal combiner 150 algebraically combines these control signals 126, 152 and outputs a plant control signal 128 representing that combination. It is this plant control signal 128 which is received by and controls the plant 118.

Initially, the system 100 operates in a learning mode, in which training inputs are applied as the reference signal 120. The dumb 126 and intelligent 152 control signals are algebraically combined to generate the plant control signal 128. The intelligent control signal 152 is computed using the then-current adaptive weights of the neural network controller 116. Because of the positioning of the plant 118, any errors cannot be compared directly at the output of the neural network controller 116. Therefore, the performance error signal 124 is fed back, i.e. back-propagated through the plant 118 and control signal combiner 150, to provide a controller weights adjust signal 154 used for learning by the neural network controller 116.

For this back-propagation of the performance error signal 124, a error back-propagation model of the combined control signal combiner 150 and plant 118 can be used separately as discussed below for FIG. 6B.

The adaptive weights of the neural network controller 116 are then adjusted using this controller weights adjust signal 154 according to standard, well known back-propagation algorithms. After new adaptive weights are computed, the output of the neural network controller 116 is recomputed, i.e. the intelligent control signal 152 is regenerated, and recombined with the dumb control signal 126, as discussed above. The output of the plant 118, i.e. the actual performance signal 122, is then compared (algebraically combined) with the reference signal 120 via the input signal combiner 112. The performance error signal 124 is then reapplied to the dumb controller 114 and to the neural network controller 116 as a back-propagated controller weights adjust signal 154. This process is repeated until the error represented by the performance error signal 124 becomes very small (e.g. below a predetermined threshold).

During the recall phase, i.e. during normal operation, of the system 100, the reference signal 120 represents a desired performance parameter, or parameters, of the plant 118. As before, the reference signal 120 and actual performance signal 122 are combined to produce a performance error signal 124. The dumb controller 114 receives the performance error signal 124 and in accordance therewith produces the dumb control signal 126. The neural network controller 116 receives the reference signal 120 (via its input layer) and the modified performance error signal 154, and produces the intelligent control signal 152.

Ordinarily, few if any further adjustments of the adaptive weights of the neural network 116 are needed. Therefore, the performance error signal 124 only rarely need be back-propagated through the plant 118 and control signal combiner 150 during the recall phase to provide the controller weights adjust signal 154. Alternatively, the performance error signal 124 can be periodically sampled for back-propagation through the plant 118 and control signal combiner 150 to provide the controller weights adjust signal 154 for updating the learning of the neural network controller 116. This would provide for "slow on-line learning," i e. where the system 100 operates in the recall phase most of the time, but periodically, e.g. on a time-share basis, goes "off-line" to briefly operate in the learning phase to update its "education."

The dumb 126 and intelligent 152 control signals are combined algebraically within the control signal combiner 150 to produce the plant control signal 128. The actual performance signal 122 of the plant 118 is compared with the reference signal 120, with the resulting performance error signal 124 applied as discussed above. This process is repeated until the error represented by the performance error signal 124 becomes very small (e.g. below a predetermined threshold). Ordinarily, this happens very quickly as the neural network controller 116 has already learned the behavior of the plant 118 and dumb controller 114.

Figure 6B:
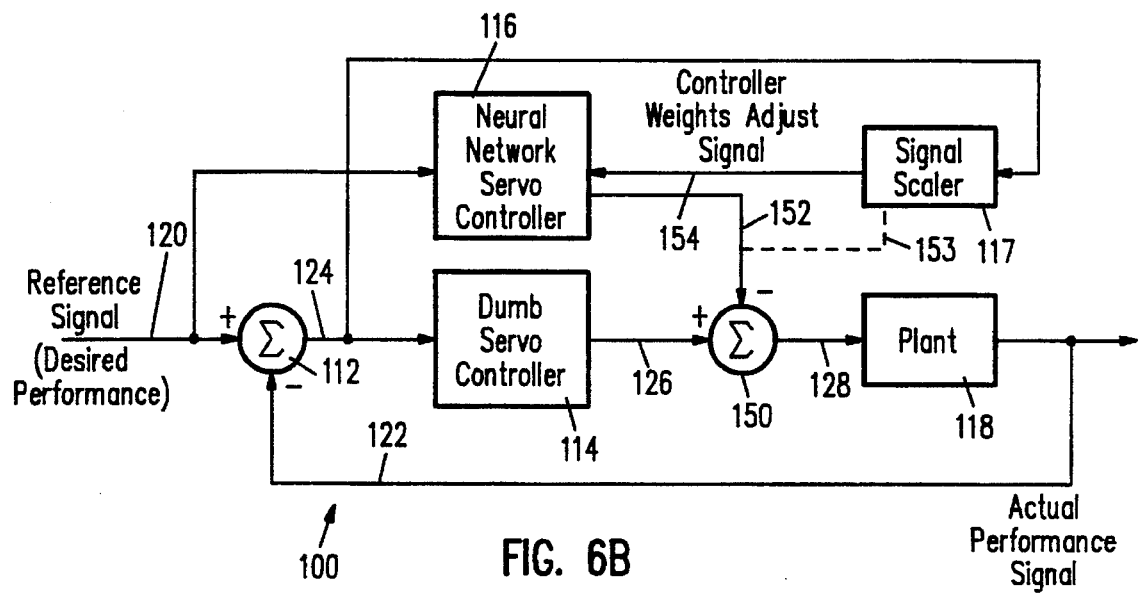

Referring to FIG. 6B, and in accordance with the foregoing discussions regarding back-propagation of signals, back-propagation of the error input signal 124 can be implemented by using a signal scaler 117. The signal scaler 117 is designed to receive and "scale" (e.g. linearly or nonlinearly) the error input signal 124 in accordance with a error back-propagation model of the combined control signal combiner 150 and plant 118 to produce the controller weights adjust signal 154 as shown. As indicated by the dashed line 153, back-propagation of the error signal 124 is a function of the intelligent control signal 152 as follows:

$$\delta = \frac{df_{N(out)}}{df_{N(in)}} \cdot (S_{PD} - S_{PA}) \frac{\partial S_{PA}}{\partial S_{IP}} \quad (2)$$

where:

$\delta$ = back-propagated error $\frac{df_{N(out)}}{df_{N(in)}}$ = derivative of neuron activation function output with respect to its input for neuron layer within neural network controller 16 whose weights are to be adjusted $S_{PD}$ = desired plant output signal -continued $S_{PA}$ = actual plant output signal $\frac{\partial S_{PA}}{\partial S_{IP}}$ = partial derivative of actual plant output signal 122 with respect to actual plant input signal 128

From the foregoing, it should be understood that no contribution from the dumb control signal 126 appears since it remains constant (i.e. a scalar, the derivative of which is zero) while the error is back-propagated through the plant 218.

Figure 7A:
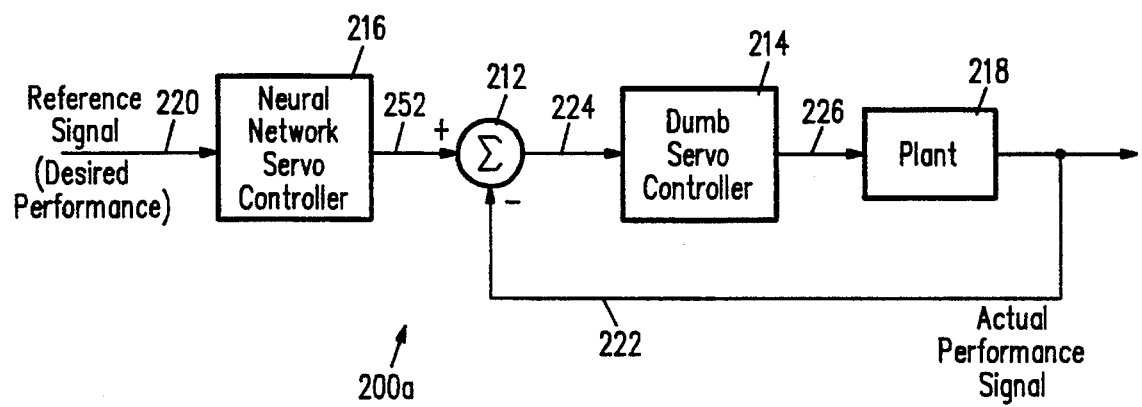
FIG. 7A illustrates a functional block diagram of an alternative preferred embodiment of a servomechanism system using an intelligent controller in accordance with the present invention.

Referring to FIG. 7A, a system 200a using a controller in accordance with an alternative preferred embodiment of the present invention includes a neural network controller 216, signal combiner 212, dumb controller 214 and plant 218, connected substantially as shown when configured to operate in its recall phase. (For purposes of clarity at this point in the discussion, the recall phase is discussed first; however, it should be understood that, prior to the recall phase, the system is first configured to operate in its learning phase, as discussed below for FIG. 7B.) In accordance with the foregoing discussion, during the recall phase, a reference signal 220, representing a desired performance parameter of the plant 218, is inputted to the input layer of the neural network controller 216. The output layer of the neural network controller 216 provides an intelligent control signal 252, which is algebraically combined in the signal combiner 212 with the actual performance signal 222 of the plant 218. This produces a performance error signal 224, which is used by the dumb controller 214 to provide the plant control signal 226 for the plant 218.

Figure 7B:
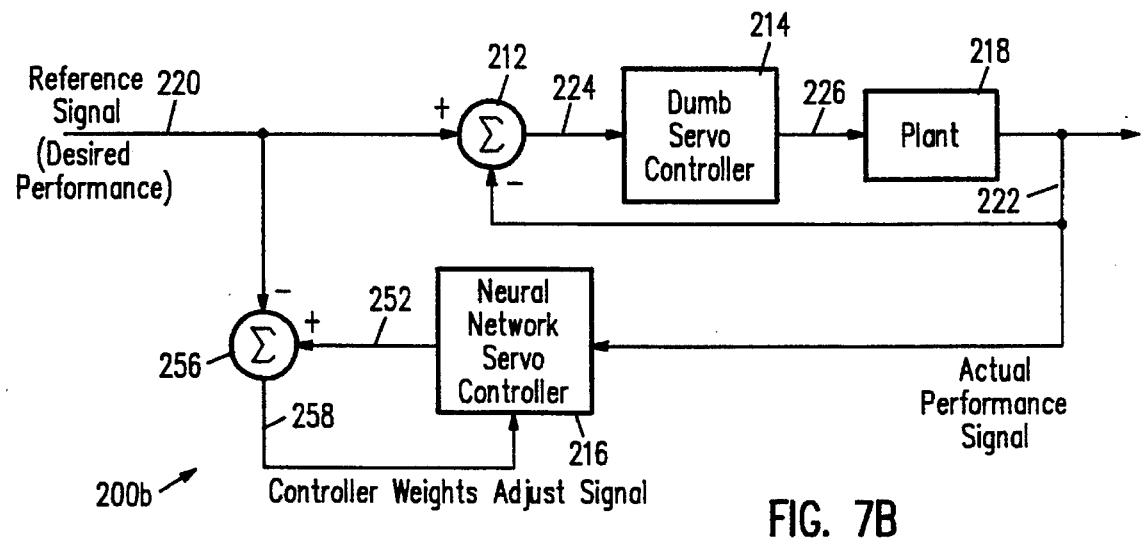
FIG. 7B illustrates a functional block diagram of the system of FIG. 7A with the intelligent controller coupled to operate in its learning mode in accordance with the present invention.

Referring to FIG. 7B, during the learning phase, a system inverse performance model of the combined signal combiner 212, dumb controller 214 and plant 218 is learned by the neural network controller 216. This is accomplished by initially configuring a system 200b for training the neural network controller 216. This "training" system 200b further includes a model signal combiner 256. The neural network controller 216 receives the actual performance signal 222 directly in the form of training inputs, while the signal combiner 212 continues to receive the reference signal 220. The reference signal 220 and the output signal 252 from the output layer of the neural network controller 216 are applied to and algebraically combined in the model signal combiner 256. This produces a performance model error signal in the form of a controller weights adjust signal 258 for adjusting the adaptive weights of the neural network controller 216. For each set of training inputs applied as the reference signal 220, the output of the plant 218, i.e. the actual performance signal 222, is applied to the input layer of the neural network controller 216 repeatedly until the error, i.e. the difference between the desired output (as represented by the reference signal 220) and the neural network output 252 and represented by the controller weights adjust signal 258 of the neural network controller 216, becomes very small (e.g. below a predetermined threshold). The "learned" neural network controller 216 is then placed in the system configuration 200a of FIG. 7A to perform in the recall phase.

Figure 8:
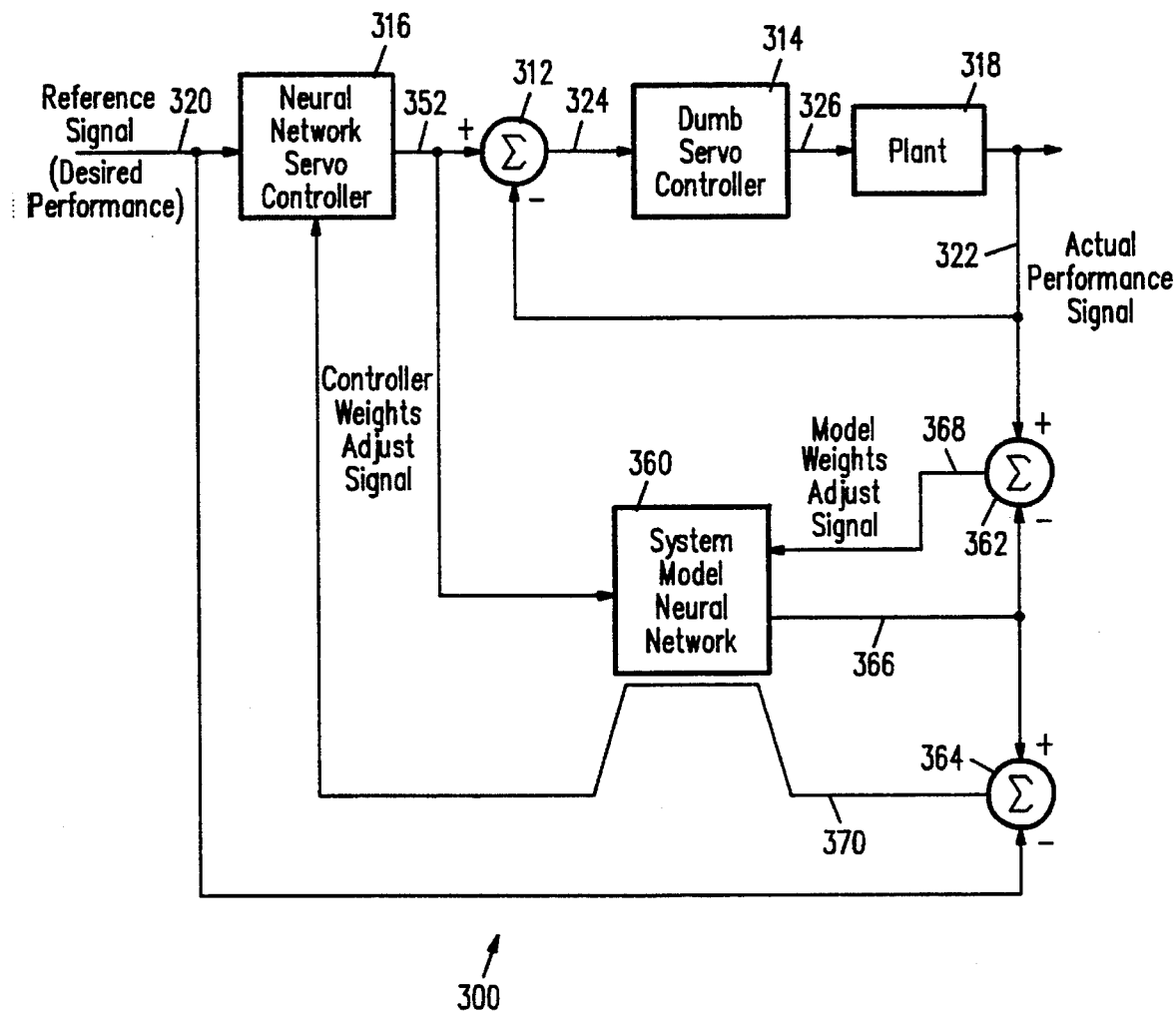
FIG. 8 illustrates a functional block diagram of an alternative preferred embodiment of a servomechanism system using an intelligent controller in accordance with the present invention.

Referring to FIG. 8, a system 300 using a controller in accordance with another alternative preferred embodiment of the present invention includes a neural network controller 316, system model neural network 360, model signal combiner 362, control signal combiner 364, input signal combiner 312, dumb controller 314 and plant 318, connected substantially as shown. The system model neural network 360 is first trained to learn a direct performance model of the combined input signal combiner 312, dumb controller 314 and plant 318. After the system model neural network 360 has modeled the combined input signal combiner 312, dumb controller 314 and plant 318, the neural network controller 316 then begins its own learning process by way of its back-propagated controller weights adjust signal 370 (discussed further below).

The reference signal 320 is received by the neural network controller 316 and control signal combiner 364. In accordance with its controller weights adjust signal 370 (discussed further below), the neural network controller 316 outputs (via its output layer) an intelligent control signal 352 to the input signal combiner 312 and input layer of the system model neural network 360. The input signal combiner 312 algebraically combines the intelligent control signal 352 and an actual performance signal 322 of the plant 318 to produce a performance error signal 324. The dumb controller 314 uses the performance error signal 324 to produce the plant control signal 326 for the plant 318.

The model signal combiner 362 receives the actual performance signal 322 and a system performance model signal 366 from the output layer of the system model neural network 360. These signals 322, 366 are algebraically combined to produce a model weights adjust signal 368 representing the difference between the input signals 322, 366 for adjusting the adaptive weights of the system model neural network 360 during the learning of the direct performance model of the combined input signal combiner 312, dumb controller 314 and plant 318.

The control signal combiner 364 also receives the system performance model signal 366, and algebraically combines it with the reference signal 320 to produce an error feedback signal 370, which represents the difference between the two input signals 366, 320. This error feedback signal 370 is back-propagated through the system model neural network 360 (after the system model neural network 360 has learned the aforementioned direct performance model as discussed above) to provide the controller weights adjust signal for adjusting the adaptive weights of the neural network controller 316.

The above-discussed direct performance model of the combined input signal combiner 312, dumb controller 314 and plant 318 learned by the system model neural network 360 represents the "direct" performance of these elements. In other words, the direct performance model of the combined input signal combiner 312, dumb controller 314 and plant 318 represents the output signal (actual performance signal 322) from the plant 318 produced as a result of the input signal (intelligent control signal 352) to the input signal combiner 312.

Ordinarily, further minor adjustments of the adaptive weights are periodically needed for the neural network controller 316 and system model neural network 360 due to normal parameter variations. Therefore, occasionally during the recall phase the model weights adjust signal 368 is used and the controller weights adjust signal 370 is back-propagated through the system model neural network 360. Alternatively, the model weights adjust signal 368 can be periodically sampled, followed by back-propagation of the controller weights adjust signal 370 through the system model neural network 360 for updating the learning of the system model neural network 360 and neural network controller 316, respectively. This would provide for "slow on-line learning," i e. where the system 300 operates in the recall phase most of the time, but periodically, e.g. on a time-share basis, goes "off-line" to briefly operate in its learning phase to update its "education."

During the learning by the above-discussed neural network controllers and model neural network, "perturbations" of the various signal combiners, dumb controllers and plants, i.e. by exercising their respective input signals over their full expected value ranges, can be performed. This can be beneficial as it will allow the neural network controllers and model neural network to learn more completely (e.g. more complete error back-propagation model and direct performance model) by accounting, in particular, for the typically nonlinear forward transfer functions of dumb controllers and plants.

Figure 9:
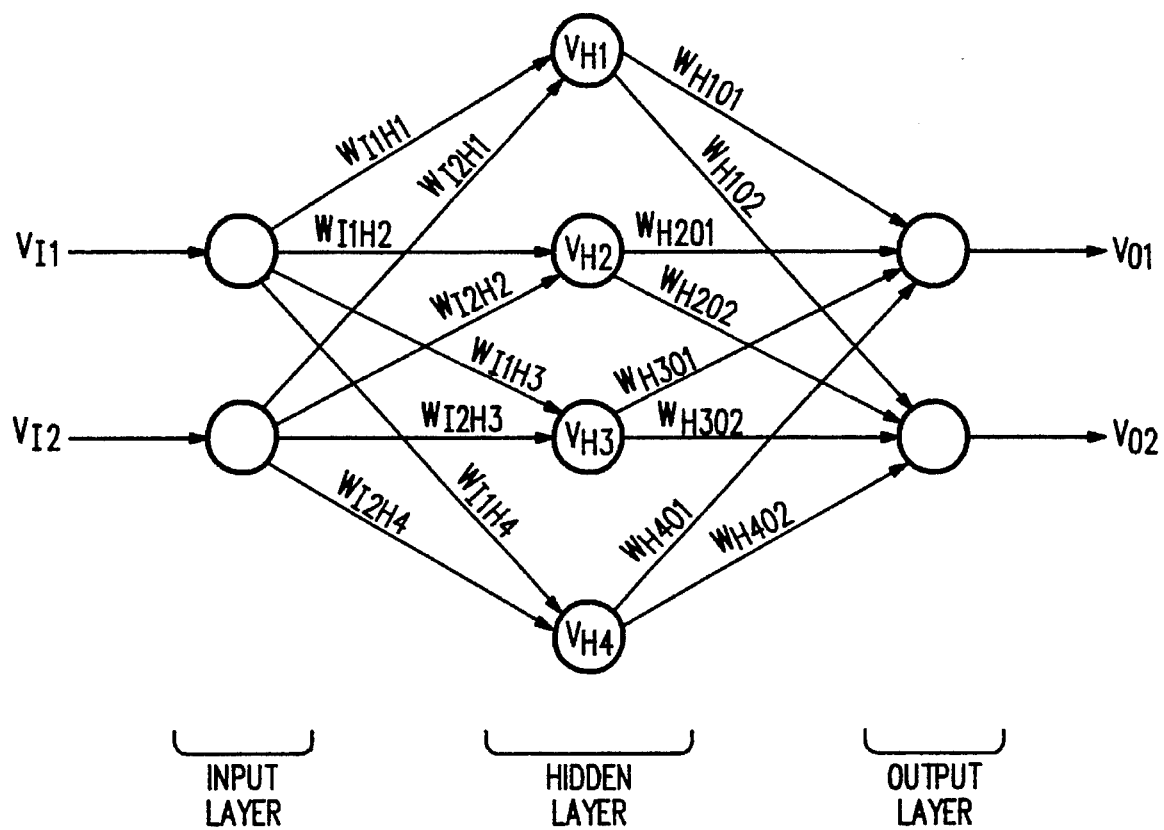
FIG. 9 illustrates a functional block diagram of a back-propagation neural network suitable for use in a controller in accordance with the present invention.

Referring to FIG. 9, back-propagation in a neural network can be better understood. (Whereas FIG. 9 depicts a simple neural network with two-neuron input and output layers and a four-neuron hidden layer, it should be understood that the following discussion and example is applicable to larger networks as well.) As is well known in the art, input signals $V_{Im}$ to the input layer neurons are weighted by the interneural, or inter-layer, weights $W_{ImHn}$ and transferred to the hidden layer neurons (where $m \epsilon \{1,2,3, \ldots\}$). In turn, the hidden layer signals $V_{Hn}$ (where $n \epsilon \{1,2,3, \ldots\}$) are weighted by inter-layer weights $W_{HnOp}$ and transferred to the output layer neurons to generate output layer signals $V_{Op}$ (where $p \epsilon \{1,2,3, \ldots\}$).

During the learning phase, an error $\epsilon$, which is the difference between the value of an actual output signal $V_{Op}$ and that of a desired signal, is back-propagated through two of the three neural layers (i.e. the output and hidden layers). This back-propagation of an error 68 occurs in the form of modifying the inter-layer weights $W_{HnOp}$ (both input-to-hidden and hidden-to-output) so as to cause the actual input signal $V_{Im}$ to produce the desired output signal $V_{Op}$. Using one exemplary signal path for input signal $V_{I1}$ and output signal $V_{O1}$, this can be expressed mathematically as follows:

$$W_{HnOp}^* = W_{HnOp} + \alpha \cdot V_{Hn} \cdot \frac{df_{O(out)}}{df_{O(in)}} \cdot \epsilon \qquad (3)$$

$$W_{ImHn}^* = W_{ImHn} + \beta \cdot V_{Im} \cdot \frac{df_{H(out)}}{df_{H(in)}} \cdot \sum_p (W_{HnOp} \cdot \delta_{out(p)})$$

where:

$W_{ImHn}^*$=new input-to-hidden layer weights $W_{HnOp}^*$=new hidden-to-output layer weights $W_{ImHn}$=current input-to-hidden layer weights $W_{HnOp}$=current hidden-to-output layer weights $$\delta_{out} = (V_{Op[ACTUAL]} - V_{Op[DESIRED]}) \frac{df_{O(out)}}{df_{O(in)}}$$

$V_{Hn}$=output signal from hidden layer neuron n $V_{Im}$=input signal to input layer neuron m $V_{Op}$=output signal from output layer neuron p $\alpha$=learning constant $\beta$=learning constant $\frac{df_{O(out)}}{df_{O(in)}}$ = derivative of neuron activation function output with respect to its input for output layer neuron -continued $$\frac{df_{H(out)}}{df_{H(in)}} = \begin{array}{c} \text{derivative of neuron activation function} \\ \text{output with respect to its input for} \\ \text{hidden layer neuron} \end{array}$$

Figure 10:
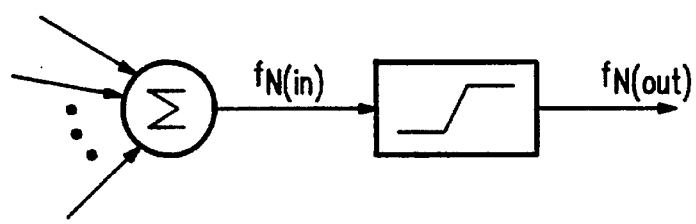
FIG. 10 illustrates a functional block diagram of an exemplary neuron suitable for use in the neural network of FIG. 9.

$\epsilon$=difference between value of an actual output signal $V_{Op}$ and a desired output signal $m \epsilon \{1,2,3, \ldots\}$
$n \epsilon \{1,2,3, \ldots\}$
$p \epsilon \{1,2,3, \ldots\}$ Referring to FIG. 10, the above-mentioned "neuron activation functions" can be better understood. In an exemplary neuron suitable for use in the above-discussed neural networks, each neuron typically includes some form of input signal adder which sums the various input signals to the neuron. The resultant signal $f_{N(in)}$ forms the input signal upon which the neuron activation function (e.g. a threshold function) operates to produce the final neuron output signal $f_{N(out)}$.

Each of the neural network controllers and model neural network discussed above preferably consists of a back-propagation neural network. However, from the foregoing, it should be understood that other types of neural networks which use supervised learning can be substituted for the back-propagation neural network controllers and model neural network discussed above. For example, multi-layer perceptrons and MADALINE (Multiple ADAptive LINear Element) neural networks can be used as well.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. A neural network controller for a plant which has a desired plant performance parameter represented by a reference signal and which has an actual plant performance parameter represented by an actual performance signal, said neural network controller comprising:

a first input port for inputting a controller weights adjust signal;

a second input port for inputting a dumb control signal;

neural network means coupled to said first and second input ports for receiving said inputted controller weights adjust signal and dumb control signal, and for processing said inputted dumb control signal in accordance with said inputted controller weights adjust signal to generate a plant control signal;

an output port for outputting said plant control signal; and input signal combiner means coupled to said first input port for receiving and combining a reference signal and an actual performance signal and for providing in accordance therewith a first performance error signal, wherein said reference signal represents a desired plant performance parameter, said actual performance signal represents an actual plant performance parameter and said first performance error signal represents a first difference between said desired plant performance parameter and said actual plant performance parameter.

2. A neural network controller as recited in claim 1, wherein said input signal combiner means comprises a signal adder.

3. A neural network controller as recited in claim 1, further comprising a plant coupled to said output port, wherein said performance error signal is back-propagated through said plant to produce said controller weights adjust signal.

4. A neural network controller as recited in claim 3, wherein said plant comprises a servomechanism.

5. A neural network controller as recited in claim 1, further comprising dumb controller means coupled to said second input port for receiving a second performance error signal and providing in accordance therewith said dumb control signal, wherein said second performance error signal represents a second difference between said desired plant performance parameter and said actual plant performance parameter.

6. A neural network controller as recited in claim 5, further comprising a plant coupled to said output port for receiving said plant control signal and providing said actual performance signal.

7. A neural network controller for a plant which has a desired plant performance parameter represented by a reference signal and which has an actual plant performance parameter represented by an actual performance signal, said neural network controller comprising:

neural network means for receiving a reference signal and a controller weights adjust signal, and for providing in accordance therewith an intelligent control signal, wherein said reference signal represents a desired plant performance parameter;

control signal combiner means coupled to said neural network means for receiving and combining said intelligent control signal and a dumb control signal, and for providing in accordance therewith a plant control signal; and input signal combiner means coupled to said neural network means for receiving and combining said reference signal and an actual performance signal which represents an actual plant performance parameter, and for providing in accordance therewith a performance error signal which represents a difference between said desired plant performance parameter and said actual plant performance parameter.

8. A neural network controller as recited in claim 7, wherein said input signal combiner means comprises a signal adder.

9. A neural network controller as recited in claim 1, further comprising a plant coupled to said control signal combiner means, wherein said performance error signal is back-propagated through said plant and said control signal combiner means to produce said controller weights adjust signal.

10. A neural network controller as recited in claim 9, wherein said plant comprises a servomechanism.

11. A neural network controller as recited in claim 7, further comprising dumb controller means coupled to said input signal combiner means for receiving said performance error signal and providing in accordance therewith said dumb control signal.

12. A neural network controller as recited in claim 11, further comprising a plant coupled to said control signal combiner means for receiving said plant control signal and providing said actual performance signal.

13. A neural network controller for simulating an inverse performance model of a system which includes a dumb controller and a plant, wherein said plant has a desired plant performance parameter represented by a reference signal and has an actual plant performance parameter represented by an actual performance signal, said neural network controller comprising:

neural network means for receiving an actual performance signal and a performance model error signal, and for providing in accordance therewith a system inverse performance model signal, wherein said actual performance signal represents an actual plant performance parameter of a plant within a system which includes said plant and a dumb controller, said performance model error signal represents a difference between said system inverse performance model signal and a reference signal, said system inverse performance model signal represents an inverse performance model of said system, and said reference signal represents a desired plant performance parameter of said plant; and model signal combiner means coupled to said neural network means for receiving and combining said system inverse performance model signal and said reference signal, and for providing in accordance therewith said performance model error signal.

14. A neural network controller as recited in claim 13, wherein said neural network means comprises a back-propagation neural network.

15. A neural network controller as recited in claim 13, wherein said model signal combiner means comprises a signal adder.

16. A neural network controller as recited in claim 13, further comprising input signal combiner means coupled to said model signal combiner means for receiving and combining said reference signal and said actual performance signal, and for providing in accordance therewith a performance error signal which represents a difference between said desired plant performance parameter and said actual plant performance parameter.

17. A neural network controller as recited in claim 16, further comprising dumb controller means coupled to said input signal combiner means for receiving said performance error signal and for providing in accordance therewith a plant control signal.

18. A neural network controller as recited in claim 17, further comprising a plant coupled to said dumb controller means for receiving said plant control signal and providing said actual performance signal.

19. A neural network controller for a plant which has a desired plant performance parameter represented by a reference signal and which has an actual plant performance parameter represented by an actual performance signal, said neural network controller comprising:

control neural network means for receiving a reference signal and a controller weights adjust signal, and for providing in accordance therewith an intelligent control signal, wherein said reference signal represents a desired plant performance parameter;

model neural network means coupled to said control neural network means for receiving said intelligent control signal and a performance model error signal, and for providing in accordance therewith a system performance model signal, wherein said performance model error signal represents a difference between said system performance model signal and an actual performance signal, said system performance model signal represents a performance model of a system which includes a dumb controller and a plant, and said actual performance signal represents an actual plant performance parameter of said plant;

control signal combiner means coupled to said control neural network means and said model neural network means for receiving and combining said reference signal and said system performance model signal, and for providing in accordance therewith an error feedback signal; and model signal combiner means coupled to said model neural network means for receiving and combining said system performance model signal and said actual performance signal, and for providing in accordance therewith said performance model error signal.

20. A neural network controller as recited in claim 19, wherein said control neural network means comprises a back-propagation neural network.

21. A neural network controller as recited in claim 19, wherein said model neural network means comprises a back-propagation neural network.

22. A neural network controller as recited in claim 19, wherein said control signal combiner means comprises a signal adder.

23. A neural network controller as recited in claim 19, wherein said model signal combiner means comprises a signal adder.

24. A neural network controller as recited in claim 19, wherein said error feedback signal is back-propagated through said model neural network means to produce said controller weights adjust signal.

25. A neural network controller as recited in claim 19, further comprising input signal combiner means coupled to said control neural network means for receiving and combining said intelligent control signal and said actual performance signal, and for providing in accordance therewith a performance error signal which represents a difference between said desired plant performance parameter and said actual plant performance parameter.

26. A neural network controller as recited in claim 25, further comprising dumb controller means coupled to said input signal combiner means for receiving said performance error signal and providing in accordance therewith a plant control signal.

27. A neural network controller as recited in claim 26, further comprising a plant coupled to said dumb controller means for receiving said plant control signal and providing said actual performance signal.

28. A method for controlling a plant with a neural network controller, wherein said plant has a desired plant performance parameter represented by a reference signal and has an actual plant performance parameter represented by an actual performance signal, said control method comprising the steps of:

inputting a controller weights adjust signal and a dumb control signal to a neural network;

processing said dumb control signal in accordance with said controller weights adjust signal to produce an intelligent plant control signal;

outputting said intelligent plant control signal from said neural network;

inputting a reference signal which represents a desired plant performance parameter and an actual performance signal which represents an actual plant performance parameter;

combining said reference signal and said actual performance signal; and outputting a first performance error signal in accordance with said combined reference and actual performance signals, wherein said first performance error signal represents a first difference between said desired plant performance parameter and said actual plant performance parameter.

29. A control method as recited in claim 28, wherein said step of combining said reference signal and said actual performance signal comprises combining said reference signal and said actual performance signal in a signal adder.

30. A control method as recited in claim 28, further comprising the step of back-propagating said first performance error signal through a plant to produce said controller weights adjust signal.

31. A control method as recited in claim 28, further comprising the step of inputting a second performance error signal to a dumb controller and in accordance therewith outputting therefrom said dumb control signal.

32. A control method as recited in claim 31, further comprising the step of inputting said plant control signal to a plant and outputting therefrom said actual performance signal.

33. A method for controlling a plant with a neural network controller, wherein said plant has a desired plant performance parameter represented by a reference signal and has an actual plant performance parameter represented by an actual performance signal, said control method comprising the steps of:

inputting a plurality of network input signals to a neural network, including a controller weights adjust signal and a reference signal which represents a desired plant performance parameter;

outputting an intelligent control signal from said neural network in accordance with said plurality of network input signals;

inputting to and combining in a control signal combiner a plurality of controller signals, including said intelligent control signal and a dumb control signal;

outputting a plant control signal from said control signal combiner in accordance with said inputted and combined plurality of controller signals;

inputting and combining a plurality of input signals, including said reference signal and an actual performance signal which represents an actual plant performance parameter; and outputting a performance error signal in accordance with said combined plurality of input signals, wherein said performance error signal represents a difference between said desired plant performance parameter and said actual plant performance parameter.

34. A control method as recited in claim 33, wherein said step of inputting and combining a plurality of input signals comprises inputting to and combining in a signal adder said plurality of input signals.

35. A control method as recited in claim 33, further comprising the step of back-propagating said performance error signal through a plant and said control signal combiner to produce said controller weights adjust signal.

36. A control method as recited in claim 33, further comprising the step of inputting said performance error signal to a dumb controller and in accordance therewith outputting therefrom said dumb control signal.

37. A control method as recited in claim 36, further comprising the step of inputting said plant control signal to a plant and outputting therefrom said actual performance signal.

38. A method for simulating with a neural network an inverse performance model of a system which includes a dumb controller and a plant, wherein said plant has a desired plant performance parameter represented by a reference signal and has an actual plant performance parameter represented by an actual performance signal, said simulation method comprising the steps of:

inputting a plurality of network input signals to a neural network, including an actual performance signal and a performance model error signal;

outputting a system inverse performance model signal from said neural network in accordance with said plurality of network input signals, wherein said actual performance signal represents an actual plant performance parameter of a plant within a system which includes a plant and a dumb controller, and said performance model error signal represents a difference between said system inverse performance model signal and a reference signal, said system inverse performance model signal represents an inverse performance model of said system, and said reference signal represents a desired plant performance parameter of said plant;

combining said system inverse performance model signal and said reference signal; and outputting said performance model error signal in accordance with said combined system inverse performance model signal and reference signal.

39. A simulation method as recited in claim 38, wherein said step of inputting a plurality of network input signals to a neural network comprises inputting a plurality of network input signals to a back-propagation neural network.

40. A simulation method as recited in claim 38, wherein said step of combining said system inverse performance model signal and said reference signal comprises combining said system inverse performance model signal and said reference signal in a signal adder.

41. A simulation method as recited in claim 38, further comprising the steps of combining said reference signal and said actual performance signal, and outputting in accordance therewith a performance error signal which represents a difference between said desired plant performance parameter and said actual plant performance parameter.

42. A simulation method as recited in claim 41, further comprising the step of inputting said performance error signal to a dumb controller and outputting in accordance therewith a plant control signal.

43. A simulation method as recited in claim 42, further comprising the step of inputting said plant control signal to a plant and outputting therefrom said actual performance signal.

44. A method for controlling a plant with a neural network controller, wherein said plant has a desired plant performance parameter represented by a reference signal and has an actual plant performance parameter represented by an actual performance signal, said control method comprising the steps of:

inputting a plurality of network input signals to a control neural network, including a controller weights adjust signal and a reference signal which represents a desired plant performance parameter;

outputting an intelligent control signal from said control neural network in accordance with said plurality of network input signals;

inputting said intelligent control signal and a performance model error signal to a model neural network;

outputting a system performance model signal from said model neural network in accordance with said intelligent control signal and said performance model error signal, wherein said performance model error signal represents a difference between said system performance model signal and an actual performance signal, said system performance model signal represents a performance model of a system which includes a dumb controller and a plant, and said actual performance signal represents an actual plant performance parameter of said plant;

combining said reference signal and said system performance model signal;

outputting an error feedback signal in accordance with said combined reference signal and system performance model signal;

combining said system performance model signal and said actual performance signal; and outputting said performance model error signal in accordance with said combined system performance model signal and actual performance signal.

45. A control method as recited in claim 44, wherein said step of inputting a plurality of network input signals to a control neural network comprises inputting a plurality of network input signals to a back-propagation neural network.

46. A control method as recited in claim 44, wherein said step of inputting said intelligent control signal and a performance model error signal to a model neural network comprises inputting said intelligent control signal and a performance model error signal to a back-propagation neural network.

47. A control method as recited in claim 44, wherein said step of combining said reference signal and said system performance model signal comprises combining said reference signal and said system performance model signal in a signal adder.

48. A control method as recited in claim 44, wherein said step of combining said system performance model signal and said actual performance signal comprises combining said system performance model signal and said actual performance signal in a signal adder.

49. A control method as recited in claim 44, further comprising the step of back-propagating said error feedback signal through said model neural network to produce said controller weights adjust signal.

50. A control method as recited in claim 44, further comprising the steps of combining said intelligent control signal and said actual performance signal, and outputting in accordance therewith a performance error signal which represents a difference between said desired plant performance parameter and said actual plant performance parameter.

51. A control method as recited in claim 50, further comprising the steps of inputting said performance error signal to a dumb controller and outputting in accordance therewith a plant control signal.

52. A control method as recited in claim 51, further comprising the step of inputting said plant control signal to a plant and outputting therefrom said actual performance signal.

* * * * *